(12) United States Patent
Ward et al.

(10) Patent No.: US 8,349,184 B2
(45) Date of Patent: Jan. 8, 2013

(54) LOWERING VISCOSITY OF BIOSOLIDS

(75) Inventors: Owen P. Ward, Waterloo (CA); Ajay Singh, Milton (CA)

(73) Assignee: Lystek International Inc., Waterloo, Ontario (CA)

( * ) Notice: Subject to any disclaimer, the term of this patent is extended or adjusted under 35 U.S.C. 154(b) by 400 days.

(21) Appl. No.: 12/716,496

(22) Filed: Mar. 3, 2010

(65) Prior Publication Data
US 2010/0223969 A1    Sep. 9, 2010

(30) Foreign Application Priority Data

Mar. 3, 2009  (GB) .................................. 0903740.9

(51) Int. Cl.
*C02F 3/00* (2006.01)
*C05F 3/00* (2006.01)

(52) U.S. Cl. ............ 210/609; 210/740; 210/749; 71/11; 71/12

(58) Field of Classification Search .................. 210/698, 210/740, 749, 757, 764, 609, 709, 710; 71/11, 71/12, 13, 21, 22
See application file for complete search history.

(56) References Cited

U.S. PATENT DOCUMENTS

| | | | | |
|---|---|---|---|---|
| 3,950,159 | A * | 4/1976 | Fox et al. | 71/11 |
| 3,960,718 | A * | 6/1976 | Lebo | 210/764 |
| 5,443,613 | A | 8/1995 | Robinson | |
| 5,534,437 | A * | 7/1996 | Arrau | 71/9 |
| 6,808,636 | B2 | 10/2004 | Ward et al. | |
| 2006/0243009 | A1 | 11/2006 | Burnham | |
| 2006/0254331 | A1 * | 11/2006 | Burnham | 71/11 |
| 2007/0062233 | A1 | 3/2007 | Burnham | |
| 2007/0128712 | A1 | 6/2007 | Le et al. | |
| 2008/0230484 | A1 | 9/2008 | Burnham et al. | |

FOREIGN PATENT DOCUMENTS

| | | |
|---|---|---|
| CA | 1074926 | 5/2004 |
| CA | 2450549 | 5/2004 |
| GB | 2430673 | 4/2007 |

OTHER PUBLICATIONS

Sodium Nitrate MSDS, Sciencelab.com, Nov. 1, 2010.*

* cited by examiner

*Primary Examiner* — Lucas Stelling
(74) *Attorney, Agent, or Firm* — Anthony Asquith Corp.

(57) ABSTRACT

Sewage sludge is dewatered to a cake-like state. The viscosity of the sludge is lowered by admixing a quantity of urea, urea-ammonium-nitrate, or other nitrogen-containing material, in with the dewatered sludge. The treatment also removes pathogens, and renders the product suitable for use as a fertilizer.

15 Claims, No Drawings

LOWERING VISCOSITY OF BIOSOLIDS

This technology relates to the disposal of sewage sludge, and relates also to the production of such value-materials as fertilizers from sewage sludge and other biosolids materials.

SUMMARY OF PRIOR PATENT PUBLICATIONS

U.S. Pat. No. 5,443,613 (22 Aug. 1995) describes a method for producing a suspension fertilizer;

US-2006/0,243,009 (2 Nov. 2006) describes manufacturing of bioorganic-augmented high nitrogen-containing inorganic fertilizers;

US-2007/0,062,233 (22 Mar. 2007) describes an organic containing sludge to fertilizer alkaline conversion process;

GB-2,430,673 (4 Apr. 2007) describes treatment of putrescible cakes. During the treatment period of this invention the pH was observed to rise rapidly;

US-2008/0,230,484 (25 Sep. 2008) describes a process for treating sludge and manufacturing bio-organically-augmented high nitrogen-containing inorganic fertilizer.

U.S. Pat. No. 6,808,636 (12 Dec. 2002) describes lowering viscosity of dewatered sludge by subjecting the sludge to violent shearing.

SOME ASPECTS OF THE NEW TECHNOLOGY

It has been observed and recognized that mixing a nitrogen-containing material (such as urea) with a biosolids material (such as dewatered sewage-sludge) gives rise to a product that has a surprisingly low viscosity. There are other instances of two solids, which, when mixed together, produce a liquid; however, it is surprising that the degree to which the viscosity of solid-sludge can be lowered by admixing a given weight of (solid) urea is significantly greater than the degree to which the viscosity of the dewatered sludge can be lowered by admixing that same weight of water.

The lowering of the viscosity of the dewatered sludge (and turning solid sludge into a liquid) simplifies the transportation of the sludge. Liquid sludge can be pumped into and out of storage tanks. Liquid sludge can be pumped, using such ordinary pumping machinery as is (almost) always available on a farm. Liquid sludge can be sprayed onto fields, or can be injected directly into the soil, under the ground surface, without the need for special equipment.

The lowering of the viscosity of the sludge (e.g to the point of liquefaction) by the addition of urea etc, is an added side-bonus, given that it is economical, sometimes, to add nitrogen-containing materials to sludge, simply to increase the nitrogen content of the sludge, and thereby improve its performance as a fertilizer. In that sense, the lowering of the viscosity costs nothing, and even has what may be termed a negative cost, in that the resulting sludge product can have a significantly-increased economic value.

Adding N-containing materials to biosolids material, such as dewatered sludge, can be done in many different ways. For example, the procedure can be done in conjunction with a municipal sewage treatment plant, thus reducing the cost of transporting the sludge to the treatment plant. Also, in that case, the disposal of sewage sludge, and the sale of fertilizer, can be a combined operation. The mixing might alternatively be done in a purpose-built mixing station, to which the biosolids material and the N-containing material are both transported.

Adding N-containing materials to a biosolids material, such as dewatered sludge, is a versatile procedure, in that the resulting product can be engineered to have a variety of properties. Apart from the lowered viscosity, the requirement might be for a particular mixture that gives rise, for example, to a stable product that can be stored, reasonably economically, over the winter months if necessary, awaiting application to agricultural land the following season. Also, different farms need different fertilizers, and it is a simple matter to vary the mixtures, to create products to suit the differing needs.

Regarding the level of dewatering of the sludge, as a limit below which the present technology becomes uneconomical, the following comments may be made. Adding N-material to sludge that has been dewatered only slightly—say, to less than six or seven percent dry solids, for instance—is likely not effective to create an economically-significant lowering of the viscosity of the slightly-dewatered sludge. The reason is that the only-slightly-dewatered sludges already have a low enough viscosity as to be readily pumpable, and also, an uneconomically-large quantity of N-material would have to be added, in order to make much difference to the viscosity.

Preferably, the sludge as used in the present technology is sludge that has been dewatered so much that the material is readily characterizable as a non-liquid. There is no clear-cut boundary as to the level of the dry-solids-content at which sludges below are liquid and sludges above are solid. But for present purposes, the dewatering level at which a less-dewatered sludge would be classed as a liquid, while a more-dewatered sludge would be classed as a non-liquid, is sludge that has been dewatered to about nine or ten percent dry-solids-content. Then, above that level of dewatering, at some still higher level of the dry-solids-content, sludges become characterizable as solid, as distinct from non-liquid.

In short, it is unlikely that it would be economically effective to apply the present technology to sludge that has been dewatered to less than about nine percent solids. Applying the present technology to sludge that has been dewatered to less than about six percent sludge likely would not be effective at all to lower the viscosity of the sludge to a significant degree.

At the other end of the scale, there is no reason why the technology cannot be applied to sludge that has been dewatered to, say, thirty percent dry-solids, or higher. The addition of urea or other N-material can be expected to effect a significant lowering of viscosity to such very stiff sludges. Especially at these high levels of dewatering, which typically can only be achieved by (expensive) centrifuging, it is preferred that the sludge should have been at least almost liquidized by violent shearing, prior to (or at the same time as) mixing in the N-material.

It has been observed that adding only a relatively small quantity of urea or other N-material can be effective to create a very significant lowering of the viscosity of the sludge. In order for the procedure to be commercially effective, enough N-material should be added to the dewatered sludge or biosolids material to procure a lowering of the viscosity of the sludge to about forty percent or more. That is to say, where the viscosity of the dewatered sludge, prior to mixing in the N-material, is V1 centiPoise, and the viscosity of the resulting product-P is V2 centiPoise, V2 should be about forty percent of V1, or lower. The amount-A of N-material added into the dewatered sludge should be enough to achieve this degree of lowering of the viscosity; but it is recognized that the amount-A of N-material needed to accomplish this very worthwhile degree of lowering of the viscosity is surprisingly small.

As mentioned, the technology can be applied to sludges that have been dewatered very thoroughly indeed. However, at the very high levels of viscosity, the numerical values of dynamic viscosity become less meaningful, as actual numbers. For present purposes, the procedure should be carried out in such manner as to lower the viscosity of the product below about 100,000 centiPoise, in order for the product to be considered to be approaching a condition that could be characterized as liquid.

Thus, a sludge that has been dewatered to, say, thirty percent dry-solids, and has a viscosity V1 well in excess of two million centiPoise, should have an amount-A of urea or N-material admixed into it that is enough to lower the viscosity of the product-P to below 100,000 cP. It is not ruled out, in such a case, simply to add some water into the mixture in the mixing vessel, to supplement the viscosity-lowering effect of the added urea etc. But adding water is wasteful, in that resources have been employed to dewater the sludge and to eliminate the excess water, and adding water would only be done unusually. Water would only be added if and when the amount of N-material (urea, etc) has reached the limit, or at least the economical limit, that can be added. If water is added into the sludge while admixing the sludge with the amount-A of N-material, the viscosity V1 then is the viscosity the sludge would have had if the water had been a component of the sludge prior to admixing the N-material.

The present technology includes mixing a solid organic sludge cake with fertilizer, or another source of nitrogen, in a mixing vessel, under normal atmospheric conditions, to produce a pumpable liquid product with a much lower viscosity. In addition to lowering the viscosity of the biosolids from a materials handling perspective, it is desirable also to lower the microbial activity in the resulting low viscosity product. It is noted that the technology, in addition to producing a liquid product of a low viscosity, can be expected to produce a liquid product having a substantially reduced microbial count.

Preferably, the sludge has undergone substantial anaerobic digestion reactions and processes. Digestion treatment is a feature of most sewage treatment stations, from single-house septic-tank installations to municipal plants. The digestion treatment has a number of functions that are advantageous for present purposes, including preparation of the sludge for separation of the liquid and solid components, and removal of some pathogens.

Preferably, the sludge is, or includes, residue from a municipal sewage treatment plant, being a plant that treats wastewater predominantly from a human population. Sludge from other wastewater streams, such as effluents from some factories, though containing biological cellular materials, can be more difficult to treat than traditional sewage from a human population.

Preferably, at least a substantial portion of the amount-A of N-material is identical to material that is being, or has been, used commercially as agricultural fertiliser. One of the aims of the new technology is to create a product that has commercial value as an agricultural fertilizer. This aspect of the technology is facilitated if the materials used in creating the new fertilizer are already recognized as being suitable for that use.

Preferably, both the incoming biosolids material (e.g the dewatered sludge) and the outgoing product-P should be homogeneous, to the extent that, if viscosity measurements were taken throughout the material, all the measurements would be the same. For present purposes, the material is not homogeneous if it contains agglomerations (lumps) of more viscous material in a matrix of less viscous material. In lumpy material, the viscometer tends to indicate a viscosity figure that favours the less viscous matrix, whereby the viscosity number can become meaningless. If the incoming material is homogeneous, the final product likely will be homogeneous too, and measurement of the sludge and the product viscosities will be straightforward. However, the fact that accurate measurements of viscosity cannot be performed on a particular sludge, is no reason to hold back on applying the new technology to that sludge.

DESCRIPTION OF EXAMPLES

The new technology will now be further described with reference to the following examples.

The nitrogen-containing material to be added to the biosolids material can be urea, as described in the examples. Also, other substances can be used as the nitrogen-containing material.

Common nitrogen sources used in fertilizers include urea, as well as ammonium compounds and nitrate compounds, particularly ammonium nitrate. Urea, also known as carbamide, is an organic compound having the molecular formula $(NH_2)_2C0$ (alternatively $CH_4N_2O$). Urea can readily be obtained as a solid material having e.g 46% nitrogen, in the form of crystals or granules. Most of world production of urea is used as a fertilizer.

Ammonium nitrate $(NH_4)(NO_3)$ is an inorganic form of nitrogen which is also used as a fertilizer and also comes in the form of solid crystals but is typically supplied as granules. It is also used as an oxidizing agent in explosives and consequently is hazardous. Ammonium nitrate contains 35% nitrogen.

UAN (urea ammonium nitrate) is a concentrated mixture of urea and ammonium nitrate in water, in which UAN 32 (contains 32% nitrogen) consists of urea 35%, ammonium nitrate 45% and water 20%. The corresponding urea:ammonium nitrate:water ratios in UAN 30 and UAN 28 are 33:42:25 and 30:40:30, respectively.

In preparing mixtures of nitrogen fertilizers with biosolids there can be advantages in using a concentrated liquid form such as UAN, from a materials handling perspective and not least because of the hazardous nature of solid ammonium nitrate. Addition of these low-water-content UAN liquids to dewatered sewage sludge, as described herein, can be expected to lower the viscosity of the sludge to a much greater degree than addition to the sludge of an amount of water equal to that included in the UAN.

Other liquid forms of N-containing materials may be preferred in some cases. For example, aqueous concentrates of other nitrogen fertilizers can be added to dewatered biosolids; the reduction in viscosity of the mixture is greater than can be attributed to the addition of the water component alone.

EXAMPLE 1

Adding Urea to Dewatered Sludge: Effect of Amount of Urea Added

Samples (each 250 milliliters) of a sewage sludge that had been dewatered to a dry-solids concentration of thirteen percent, were placed in mixing vessels, indoors. Urea (46% N) granules were added into the vessels, and mixed into the sludge.

The degree of mixing can be described with reference to patent publication CA-2,642,313, published 29 Apr. 2009. There, a high-solids-content sludge was liquefied, or liquidized, by violent shearing. The shearing was violent in the sense that, per tonne of the sludge, the amount of energy put into shearing the sludge was (typically) twenty kilowatt-hours. In the present case, the mixing of the urea into the sludge is accompanied by mechanical stirring, the energy content of which can be estimated, by comparison, at about 0.2 kw.hr of energy. That is to say, stirring the mixture is far removed from shearing the mixture.

It can be expected that a comparable energy of stirring would be used in the case of other nitrogen-containing sources, besides urea. Of course, the amount of energy that is put into stirring or mixing a nitrogen-containing material into sludge will vary a great deal, and would only rarely even be measured. The noteworthy point is that the energy of stirring would be at least an order of magnitude less than the energy needed to liquidize a sludge by shearing.

In particular, the energy put into stirring the mixture, in the described examples, was very much less than the energy needed to mechanically tear open the biological cells of the sludge.

TABLE 1 below, records samples of the same sludge, having different additions of urea.

| Urea added (% of wt of dewatered sludge) | Sludge temperature after mixing in urea (° C.) | pH (at 0 hrs) | Viscosity (centiPoise) | | Coliform counts (CFU/gram) After 24 hrs at room temp |
|---|---|---|---|---|---|
| | | | 0 hrs | After 24 hrs at room temp | |
| 0  | 17.8 | 7.82 | 90,500 | 65,300 | 1100 |
| 5  | 11.8 | 7.80 | 68,400 | 11,600 | Non detectable* |
| 10 | 11.8 | 7.75 | 48,600 | 9,890  | Non detectable* |
| 20 | 10.1 | 7.72 | 11,320 | 7,810  | Non detectable* |
| 40 | 9.4  | 7.75 | 4,400  | 6,320  | Non detectable* |
| 80 | 9.2  | 7.75 | 3,580  | 4,900  | Non detectable* |

Attention is drawn to the following points.

1.A. The dry-solids-content of a sludge is the weight of dry solids that remains after all the water in the sludge has been driven off, including all the water contained in the biological cells of the sludge. A tonne of sludge that has been dewatered to thirteen percent dry-solids contains 130 kilograms of dry-solids and 870 kg of water. In Table.1, the weight of urea in the vessel is quoted—not as a percentage of the dry-solids content of the sludge, but—as a percentage of the overall weight of the sludge in the vessel.

1.B. In the sample represented in the first line of results in Table.1, no urea was added to the sludge. This provides a baseline for comparison. The dynamic viscosity of the thirteen-percent sludge was 90,500 centiPoise. At this, the sludge can hardly be characterized even as a very viscous liquid, but should rather be characterized as a stiff, sticky cake.

1.C. The dynamic viscosity of the stirred mixture of sludge and urea (herein termed the product) was measured, using a viscometer, after the mixture had been initially stirred, and was measured again after the mixture had been left standing for a day. The addition of urea, with gentle stirring, caused an immediate reduction in viscosity and further reductions in viscosity of the product were observed (at least with the lower levels of added urea) after 24 h. The viscometer was a Brookfield Model LVDVE115, made by Brookfield Engineering Labs Inc, of Middleboro, Mass., USA. This viscometer uses the rotational measuring procedure.

1.D. Adding urea to sludge is effective to lower the temperature of the product—the higher the added-urea level, the more significantly. (Dissolving e.g ammonium nitrate in water also lowers temperature; by contrast, dissolving e.g potassium hydroxide in water raises the temperature of the product. The temperature change can be explained in terms of enthalpy change of solution.)

1.E. Adding urea to sludge makes no immediate significant difference to the pH of the product.

1.F. Adding urea to sludge makes an immediate very significant difference to the dynamic viscosity of the product.

1.G. Adding urea to sludge is significantly effective to eliminate or reduce the coliform count of the product.

1.H. Fecal coliform bacteria are the predominant types present in feces and sewage. Their presence in a material being tested is generally indicative of the presence of pathogens in the material. Testing for fecal coliform bacteria is a common method used when testing water for safety, for example. Thus, treatment processes that kill fecal coliform bacteria in wastewater treatment plants, including sewage processing, should be regarded as enhancing the quality and safety of the material produced. Often, agricultural fertilizers are a by-product of sewage treatment processes, and processes that kill coliform bacteria enhance the safety of such fertilizers, and their commercial value. In Table.1, the coliform count is measured as colony-forming-units (CFUs), (as standardized in many jurisdictions), per gram of the sample. Coliforms in all the urea-treated products were non-detectable, being less than ten CFU per gram.

EXAMPLE 2

Adding Urea to Dewatered Sludge: Sludges of Different Solids Concentrations

Samples of differently-dewatered sludges were placed in mixing vessels, indoors. Different amounts of urea granules (of 46% nitrogen-content) were added to the vessels and mixed into the different sludges.

| sludge dry-solids (% of wt of sludge) | Urea added (% of wt of sludge) | | | | 30 Viscosity after 24 hr |
|---|---|---|---|---|---|
| | 0 Viscosity | 10 Viscosity | 20 Viscosity | 30 Viscosity | |
| 5    | 730     | 320    | 260    | 230   | 280   |
| 7.5  | 1,720   | 700    | 620    | 490   | 660   |
| 10   | 4,340   | 1,730  | 1,360  | 1,040 | 1,380 |
| 12.5 | 16,680  | 4,810  | 3,230  | 2,300 | 2,780 |
| 15   | 174,800 | 49,500 | 10,540 | 6,490 | 7,600 |

Attention is drawn to the following points.

2.A. A tonne of five-percent sludge includes fifty kilograms of dry solids, and 950 kg of water;
a tonne of 7.5 percent sludge includes seventy-five kilograms of dry solids, and 925 kg of water;
a tonne of ten percent sludge includes 100 kilograms of dry solids, and 900 kg of water;
a tonne of 12.5 percent sludge includes 125 kilograms of dry solids, and 875 kg of water;
a tonne of fifteen percent sludge includes 150 kilograms of dry solids, and 850 kg of water.

2.B. The number of kilograms of urea added is measured as a percentage of the number of kilograms of the dewatered sludge present in the vessel. In the third column of Table.2, for example, a hundred kilograms of urea were added per overall tonne of the different sludges:—
in the 5% sludge, 100 kg of urea were added per 50 kg of solids and 950 kg of water;
in the 7½% sludge, 100 kg of urea were added per 75 kg of solids and 925 kg of water;
in the 10% sludge, 100 kg of urea were added per 100 kg of solids and 900 kg of water;
in the 12½% sludge, 100 kg of urea were added per 125 kg of solids and 875 kg of water;
in the 15% sludge, 100 kg of urea were added per 150 kg of solids and 850 kg of water;
2.C. In Table.2, the zero-added-urea column is provided as a baseline for comparison. The addition of the urea to the sludge caused a dramatic lowering of the dynamic viscosities of the sludges, at all the biosolids concentrations tested.

2.D. The last column of Table.2 records the after-24 hrs viscosities of the 30%-added-urea product, for the different sludges that were recorded in the previous column. A small but significant rise in viscosity, due to the passage of 24 hrs, was observed in respect of each sludge.

The form of urea used in Example 1 and 2 below was as granular spheres of approximate diameter of about 5 mm, and with a stated nitrogen content of 46%. In other experiments, urea crystals were used; they exhibited similar results to urea spherical granules.

EXAMPLE 3

Adding Urea to Dewatered Sludge: Effect on Previously Liquidized Sludge

A sample of sludge was dewatered to 15.1 percent solids. (Thus, per tonne, the resulting cake of biosolids contained 151 kilograms of dry-solids, and 849 kilograms of water.)

Sludge with a solids-content of 15.1 percent is a stiff, sticky cake, having a dynamic viscosity (insofar as a viscosity reading is meaningful for such a non-liquid-like material) of more than 2,000,000 centiPoise. This stiff cake was subjected to violent shearing at seventy degC, at a pH of ten, for approximately one hour. The shearing was done in the manner as described in patent publication U.S. Pat. No. 6,808,636. The mechanical energy that went into shearing the sludge was approximately twenty kW.hrs per dry tonne of the sludge.

Shearing at that level homogenized and liquidized the sludge. That is to say, shearing at that level lowered the viscosity of the sludge from 2,000,000 centiPoise to 5990 centiPoise.

The effect of adding 100 kilograms of urea per tonne of this liquidized material (i.e adding ten percent urea) was evaluated by measuring (a) the viscosity of the sludge-plus-urea product after mixing in the urea, and (b) the viscosity of the zero-urea-containing control-sludge after similar mixing.

|  | Viscosity (cP) | Viscosity (cP) After 20 min | Viscosity (cP) After 24 h (24° C.) |
| --- | --- | --- | --- |
| zero added urea | 5990 | 5050 | 5150 |
| 10% added urea | 4400 | 3830 | 3520 |

Attention is drawn to the following points.

3.A. The mixing-in of additional urea at the rate of 100 kg of urea per tonne of already liquidized sludge, caused a further lowering of the viscosity of the biosolids that were previously liquidized by a combination of shearing, increasing temperature and pH.

3.B. The amount by which the viscosity can be further lowered might be expected to be quite small, because the viscosity has presumably already been lowered to nearly its maximum extent. Under the circumstances, therefore, the amount of the further lowering is really quite significant, especially as the urea-induced lowering continues for many hours after the urea has been mixed in.

Sludge having a "dry-solids-content", or "solids-content", of X percent, should be construed herein as follows:—
W-total is the overall weight of a sample of the sludge, including water plus the suspended and dissolved organic and inorganic solids.
W-solids is the weight of the residue comprising all the suspended and dissolved organic and inorganic solids that remain after all the water that can be evaporated off has been evaporated from the sample.
the "dry-solids-content" equals W-solids/W-total, expressed as a percentage.

(A convenient table comparing dry-solids percentage with viscosity is presented as Table.2A in US patent publication 2009/0107920 (30 Apr. 2009).)

The viscosity that is the subject of this specification is "dynamic viscosity", which is measured in Poise and centi-Poise. A liquid is said to have a dynamic viscosity of one Poise when a tangential force of one dyne applied per sq.cm of the liquid causes a velocity change of one cm/sec between two parallel planes in the liquid, one cm apart. Thus, one Poise is equivalent to one dyne per sq.cm per second. Thus, also, a liquid has a dynamic viscosity of one Poise when, in a one-cm cube of the liquid having opposing faces A and B, a shear force of one dyne applied between face A and face B causes face A to undergo a change in its velocity relative to face B of one cm/sec.

The amount of quantity of a substance is referred to herein as its weight. It is not required that the admixing of the dewatered sludge with the added urea or N-material be done on a batch basis, in the mixing vessel. The admixing procedure can be carried out, if desired, on a continuous or semi-continuous basis. In that case, the amount of the substance (measured in kg) would be replaced with a flowrate of the substance (measured in kg/hr, or per other unit of time).

As to a theoretical mechanism whereby admixing urea, or other N-containing material, in with the sludge is effective to lower viscosity, the following comments may be made.

Advantageously, in order to lower the viscosity of the sludge, water locked up in the biological cells in the sludge should be released. In U.S. Pat. No. 6,808,636, for example, the cells were torn apart by the violent shearing, thereby releasing water locked-up in the cells. The addition of this released water into the sludge was the factor that was effective to lower the viscosity, and to liquidize the sludge.

Generally, the water content of sewage sludge includes "loose" water and "tight" water. "Loose" water is the term used herein for the water content of the sludge that lies outside the biological cells. "Tight" water is the term used herein for the water content of the sludge that is locked up inside the biological cells. The mechanically-gentle operation of dewatering the sewage is effective to remove (some of) the "loose" water of the sludge, but is not effective to remove any of the "tight" water of the sludge.

In the new technology, the N-material (e.g urea), upon being added to the sludge, dissolves in the remaining loose water in the sludge. Urea is readily soluble in water, in that one kilogram of water can hold rather more than one kg of urea in solution. Thus, a concentration-differential is created across the cell-membranes or cell-walls. The concentration of dissolved urea in the small remaining quantity of loose water quickly rises, and can even reach saturation, since the quantity of loose water has been reduced so much by dewatering. Meanwhile, the concentration of dissolved urea within the cells is substantially zero. This concentration-differential can be enough, under the conditions as described herein, to enable water to break out of the cell, e.g by osmosis through the cell-wall, or by actually disrupting the cell-walls. Also, urea (and some of the other N-materials) complexes with lipids, and complexes with and denatures proteins, so urea will disrupt the membranes of cells that contain lipids and proteins.

Releasing the tight water from the biological cells is effective to procure the observed lowering of the viscosity of the sludge.

When the N-material is provided in the form of urea ammonium nitrate (UAN), some extra water, i.e the water in the UAN aqueous solution, is also added into the mixing vessel. However, the viscosity of the product-P is lowered by a considerably greater amount than can be accounted for by the added water. The benefits arising from the use of (liquid) UAN outweigh the associated small inefficiencies.

In order for a urea-concentration-differential to build up across the cell-membranes, the concentration level in the loose water has to be quite high, if not saturated. Only-slightly-dewatered sludges contain so much loose water that the amount of urea that would have to be added in order to raise the concentration in the loose water becomes uneconomical. Thus, the more thoroughly the sludge has been dewatered, the smaller the quantity of urea that has to be added into the mixing vessel, in order to create the conditions under which the tight water breaks through the cell-membranes. For this reason, the present technology starts to become uneconomical with sludges that have been dewatered only to about nine or ten percent dry-solids or less. A sludge that has been dewatered only to about six or seven percent dry-solids-content or less really cannot be said to be treatable at all by the technology described herein.

As to how much urea (or other N-material) should be added to the sludge (or other biosolids material), the amount-A should be enough that the viscosity V2 of the product-P is lowered to about 40% of the viscosity V1 of the sludge, or less. It is recognized that this lowering can be achieved, under the conditions as described herein, by the use of an economically-small amount of urea.

The invention claimed is:

1. Procedure for lowering the viscosity of a biosolids material, including:
    providing a mixing vessel, the biosolids material being present in the mixing vessel;
    the biosolids material in the mixing vessel has a viscosity of V1 centipoise;
    providing an amount-A of urea or urea ammonium nitrate (UAN);
    at least gently admixing the amount-A of urea or UAN in with the biosolids material, in the vessel, thereby creating a product-P;
    the product-P, thus created, has a viscosity of V2 centipoise;
    wherein the amount-A, and the manner of the mixing, are such that the viscosity V2 of the product-P is both:
    (a) about forty percent of V1 or lower; and
    (b) about 100,000 centipoise or lower.

2. As in claim 1, wherein:
    the biosolids material is substantially non-homogeneous;
    the material includes clumps, of substantial size, of a more viscous form in a matrix of a less viscous form;
    the viscosity V1 is the viscosity of the biosolids material as measured using a viscometer that employs a rotational measuring procedure.

3. As in claim 1, wherein:
    the biosolids material in the vessel includes sewage sludge;
    the sewage sludge has already been dewatered to a dry-solids-content of about six percent or more.

4. As in claim 3, wherein the sludge:
    has been dewatered to a solids content of about ten percent or more;
    has been violently sheared, and has thereby been transformed into an homogeneous liquid; and
    the liquid has a viscosity V1 of about 30,000 centipoise or lower.

5. As in claim 3, wherein the sludge is, or includes, residue from a municipal sewage treatment plant, being a plant that treats wastewater predominantly from a human population.

6. As in claim 3, wherein:
    the sludge is already-dewatered sludge that has been violently sheared, to the extent that the viscosity of the sludge placed in the mixing vessel is below 100,000 centiPoise; and
    the viscosity V1 is the viscosity of the sludge prior to its being violently sheared.

7. As in claim 3, wherein the sludge has undergone substantial anaerobic digestion reactions and processes.

8. As in claim 1, wherein the mass of the amount-A of urea or UAN added to and mixed with the biosolids material to create the product-P of viscosity V2 centipoise, is substantially smaller than the mass of an amount-W of water that, if added to the sludge, would have lowered the viscosity thereof to V2.

9. As in claim 1, including:
    subjecting the mixture in the vessel to violent shearing while the urea or UAN is being added to the biosolids material, or after the urea or UAN has been added;
    the shearing being done in such manner as to:
    (a) render the product-P highly homogeneous; and
    (b) lower the viscosity V2 of the product-P to about twenty percent of V1, or lower.

10. As in claim 1, including:
    measuring, with a viscometer:—
        the viscosity V1 of the biosolids material; and
        the viscosity V2 of the product-P;
    and, responsively to V2 being greater than about forty percent of V1;
    or to V2 being greater than about 100,000 centiPoise;
    increasing the amount-A of urea or UAN being admixed to the biosolids material.

11. As in claim 1, including:
    collecting the product-P from the vessel;
    packaging the product-P for commercial use as an agricultural fertilizer.

12. As in claim 1, including locating the mixing-vessel in, or close to, a municipal sewage treatment station.

13. As in claim 1, including:
    violently shearing the mixture in the vessel in such manner as to:
    (a) create the product-P as a homogeneous liquid; and
    (b) lower the viscosity V2 of the product-P to about twenty percent of V1, or lower.

14. As in claim 1, wherein:
    the biosolids material is homogeneous, to the extent that, if viscosity measurements were taken throughout the material, all the measurements would be substantially the same; and
    the product-P is homogeneous, to the extent that, if viscosity measurements were taken throughout the product-P, all the measurements would be substantially the same.

15. As in claim 1, including only gently stirring or mixing the amount-A of urea or UAN in with the biosolids material, in the vessel, without violent shearing.

* * * * *